United States Patent

Satran et al.

[11] Patent Number: 6,132,146
[45] Date of Patent: *Oct. 17, 2000

[54] ROTARY CUTTING TOOL

[75] Inventors: Amir Satran, Kfar Vradim; Rafael Margulis, Karmiel, both of Israel

[73] Assignee: Iscar, Ltd., Migdal Tefen, Israel

[ * ] Notice: This patent issued on a continued prosecution application filed under 37 CFR 1.53(d), and is subject to the twenty year patent term provisions of 35 U.S.C. 154(a)(2).

[21] Appl. No.: 09/338,528

[22] Filed: Jun. 23, 1999

[30] Foreign Application Priority Data

Jul. 10, 1998 [IL] Israel ......................................... 125298

[51] Int. Cl.$^7$ ........................................................ B23C 5/20
[52] U.S. Cl. .................................. 407/40; 407/43; 407/47; 407/56
[58] Field of Search .................................. 407/40, 43, 47, 407/35, 46, 51, 56

[56] References Cited

U.S. PATENT DOCUMENTS

| | | | |
|---|---|---|---|
| 3,158,922 | 12/1964 | Reese | 407/40 |
| 3,811,163 | 5/1974 | Frederick | 408/59 |
| 4,220,429 | 9/1980 | Powers | 408/224 |
| 4,789,273 | 12/1988 | Wiacek | 407/34 |
| 4,993,891 | 2/1991 | Kaminiski | 407/51 |

FOREIGN PATENT DOCUMENTS

| | | |
|---|---|---|
| 0 066 079 | 12/1982 | European Pat. Off. . |
| 2 281 325 | 12/1973 | France . |
| 6-304806 | 11/1994 | Japan . |
| 2 308 325 | 6/1997 | United Kingdom . |

*Primary Examiner*—Henry W. H. Tsai
*Attorney, Agent, or Firm*—Pennie & Edmonds LLP

[57] ABSTRACT

A rotary cutting tool with a longitudinal axis of rotation, has a cutting head formed with at least two chip evacuation flutes and at least two body portions therebetween. The body portions bear, at a front face of the cutting head, a plurality of cutting inserts mounted so that their operative cutting edges lie substantially in a plane perpendicular to the axis of rotation. A first body portion bears a first outer cutting insert and a second body portion bears a second outer cutting insert. The operative cutting edge of the second outer cutting insert is substantially shorter than the operative cutting edge of the first outer cutting insert, and their outermost ends are substantially equidistant from the axis of rotation and are spaced therefrom at a distance defining a cutting radius of the cutting tool.

8 Claims, 5 Drawing Sheets

ROTARY CUTTING TOOL

FIELD OF THE INVENTION

The present invention relates to a rotary cutting tool for use in cutting operations having a feed directed along an axis of rotation of the cutting tool.

BACKGROUND OF THE INVENTION

The present invention particularly refers to rotary cutting tools designed for rough machining at high speeds and high removal rates such as used in manufacturing dies.

A cutting tool of the above kind is disclosed, for example, in JP 06-304806. The cutting tool is designed for deep plunging operations and comprises a cutting head formed with chip evacuation flutes extending from a front face thereof along a longitudinal axis of rotation of the tool, and a plurality of cutting inserts mounted at the front face of the cutting tool on body portions thereof disposed between the flutes. The cutting inserts are mounted so that their clamping screws are directed substantially parallel to the axis of rotation of the cutting tool, and their operative cutting edges are disposed in a plane perpendicular to the axis of rotation and overlap so as to present a required number of effective cutting edges providing a pre-determined cutting radius.

It is the object of the present invention to provide a new cutting tool of the above-specified kind.

SUMMARY OF THE INVENTION

According to the present invention, there is provided a rotary cutting tool with a longitudinal axis of rotation and a pre-determined cutting radius, having a cutting head formed with at least two chip evacuation flutes and at least two body portions therebetween, which body portions bear, at a front face of the cutting head, a plurality of cutting inserts mounted so that their operative cutting edges lie substantially in a plane perpendicular to said axis of rotation;

a first body portion of said two body portions bearing a first outer cutting insert and a second body portion of said two body portions bearing a second outer cutting insert, the operative cutting edge of the second outer cutting insert being substantially shorter than the operative cutting edge of the first outer cutting insert and their outermost ends being substantially equidistant from said axis of rotation and being spaced therefrom at a distance defining said cutting radius of the cutting tool.

Preferably, the second body portion bears additionally an inner cutting insert disposed closer to the said axis of rotation than the second outer cutting insert and spaced radially from said second outer cutting insert.

Thus, the cutting tool according to the present invention is designed so that the number of the outer cutting inserts working at a periphery of the cutting tool is twice the number of the inner cutting inserts disposed closer to the axis of rotation, the additional outer cutting inserts being mounted on the same body portions of the cutting head as the inner cutting inserts and occupying minimal mounting space thereof due to their short cutting edges. The increased number of the effective outer cutting edges allows for the essential reduction of cutting forces acting on each of them at the periphery of the cutting tool where these forces are maximal, especially in cutting operations of the kind to which the present invention refers. The reduction of the cutting forces allows for the increase of the lifetime of the cutting inserts and also reduces vibrations of the cutting tool during deep cutting operations.

Furthermore, in cutting operations where only peripheral cutting edges are operative, the increased number of effective peripheral cutting edges enables the cutting tool to cut at an increased feed rate, which is particularly useful when the cutting tool is used for plunging operations in manufacturing dies, in particular when, after the main amount of material has been cut out by the plunger, undulated side walls of the cavities obtained thereby are to be flattened.

In addition, by virtue of the difference in length between the operative cutting edges of the first and second outer cutting inserts in the cutting tool of the present invention, the extent of overlapping between the inner and the first outer cutting inserts of the cutting tool may vary without any deterioration of its cutting efficiency at the periphery of the tool, whereby cutting tools of rather broad range of cutting radii may be provided.

Preferably, each cutting insert of the cutting tool of the present invention has an insert clamping screw through bore and each insert receiving pocket in which the insert is mounted on the cutting head has a base surface formed with a pocket clamping screw threaded bore to be aligned with the insert clamping through bore. Preferably, the clamping screw through bores of the inner and the first outer cutting inserts are directed substantially co-directionally with the axis of rotation of the cutting tool, and the clamping screw through bore of the second outer cutting insert is directed substantially radially with respect to the axis of rotation of the cutting tool. To this end, the base surfaces of the insert receiving pockets of the inner and the first outer cutting inserts are substantially parallel to the plane in which the operative cutting edges of the cutting inserts lie, whilst the base surface of the insert receiving pocket of the second outer cutting insert is substantially perpendicular to this plane and also to the operative cutting edge of this insert.

Preferably, the inner and the first and second outer cutting inserts are all identical and are of the kind having mutually perpendicular major and minor cutting edges, the inner and the first outer cutting inserts being mounted so as to present their major cutting edges in an operative position, whilst the second outer cutting insert is mounted so as to present its minor cutting edge in an operative position.

Preferably, the inner and the first and second outer cutting inserts are of the kind having a front cutting portion and a trailing mounting portion, the front cutting portion being formed with an operative front surface associated with mutually perpendicular major and minor cutting edges, and the trailing mounting portion having a clamping screw bore substantially perpendicular to said major cutting edge and co-directional with said minor cutting edge.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE DRAWINGS

Figure 1:
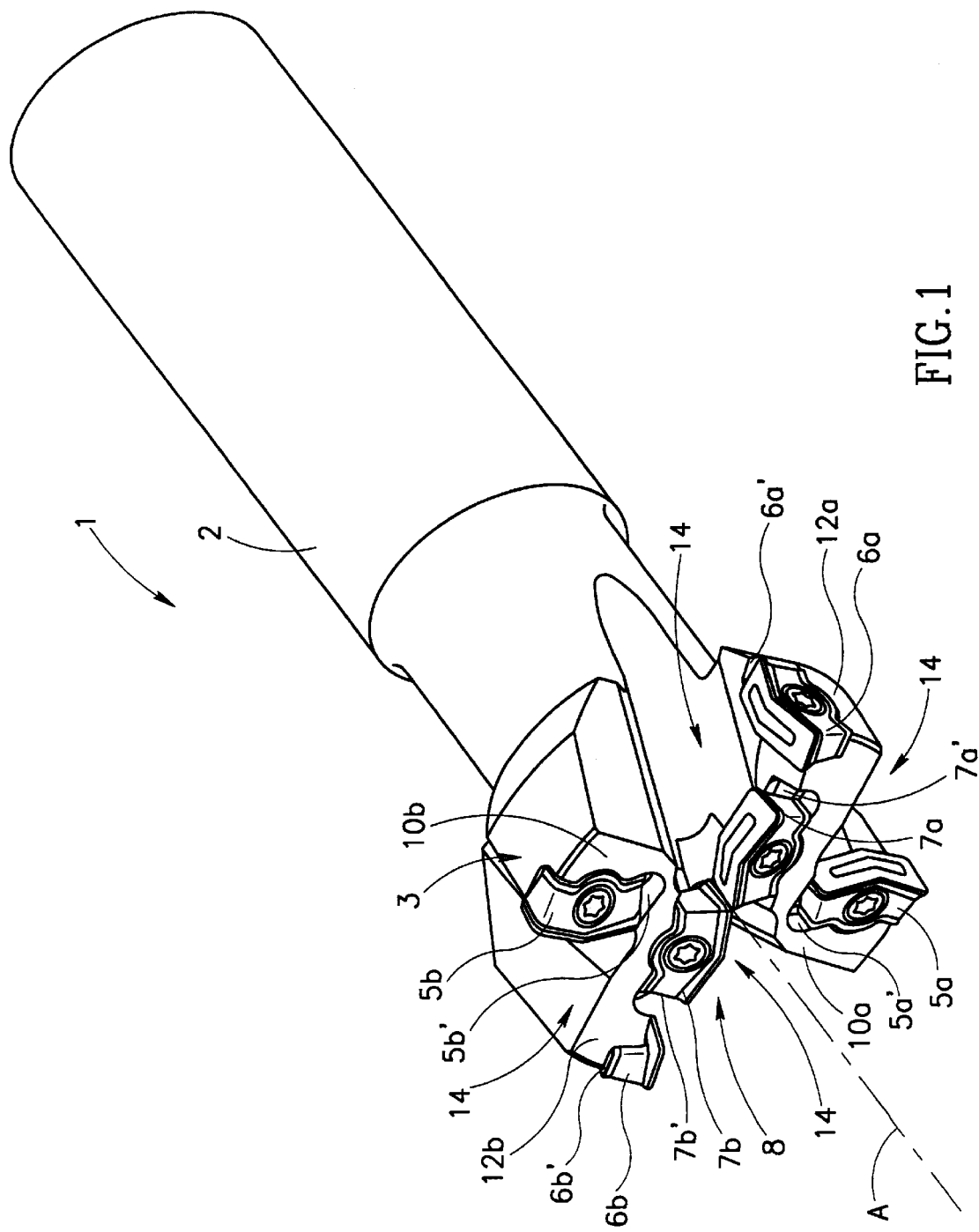
FIG. 1 is a perspective view of a cutting tool according to the present invention.
Figure 2:
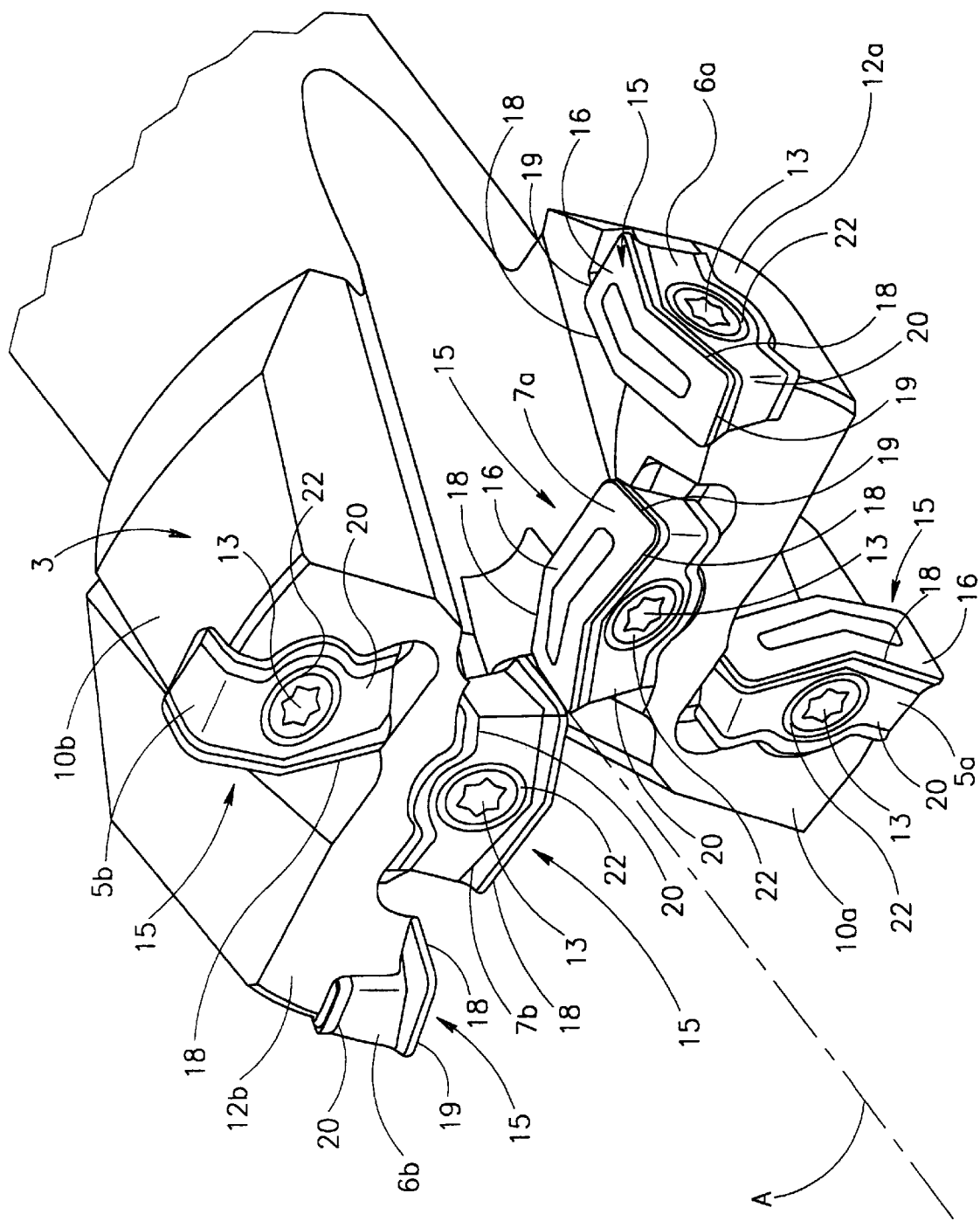
FIG. 2 is an enlarged perspective view of a front portion of the cutting tool shown in FIG. 1.

A rotary cutting tool 1 according to the present invention is shown in FIGS. 1 and 2. The cutting tool 1 comprises a cylindrical tool shank 2 having a longitudinal axis of rotation A and a cutting head 3, and a plurality of cutting inserts 5a, 5b, 6a, 6b and 7a, 7b mounted at a front face 8 of the cutting head 3 on its body portions 10a, 10b, 12a and 12b formed between four chip evacuation flutes 14. The cutting inserts 5a, 5b, 6a, 6b and 7a, 7b are mounted on the cutting head 3 by means of clamping screws 13.

The cutting inserts 5a, 5b, 6a, 6b and 7a, 7b are indexable and are of an identical design. As shown in FIG. 2, each cutting insert has a front cutting portion 15 with an operative front surface 16 associated with a pair of long major cutting edges 18 and a pair of short minor cutting edges 19, and a trailing mounting portion 20 formed with a clamping screw through bore 22 for receiving therein the clamping screw 13. The clamping screw through bore 22 extends generally co-directionally with the minor cutting edges 19. The geometry of the front cutting portion 15 of the cutting insert and the design of its trailing portion 20 are described in more detail in respective co-pending Israel Patent Applications Nos. 124,281 and 125,143 incorporated herein by reference.

Figure 3:
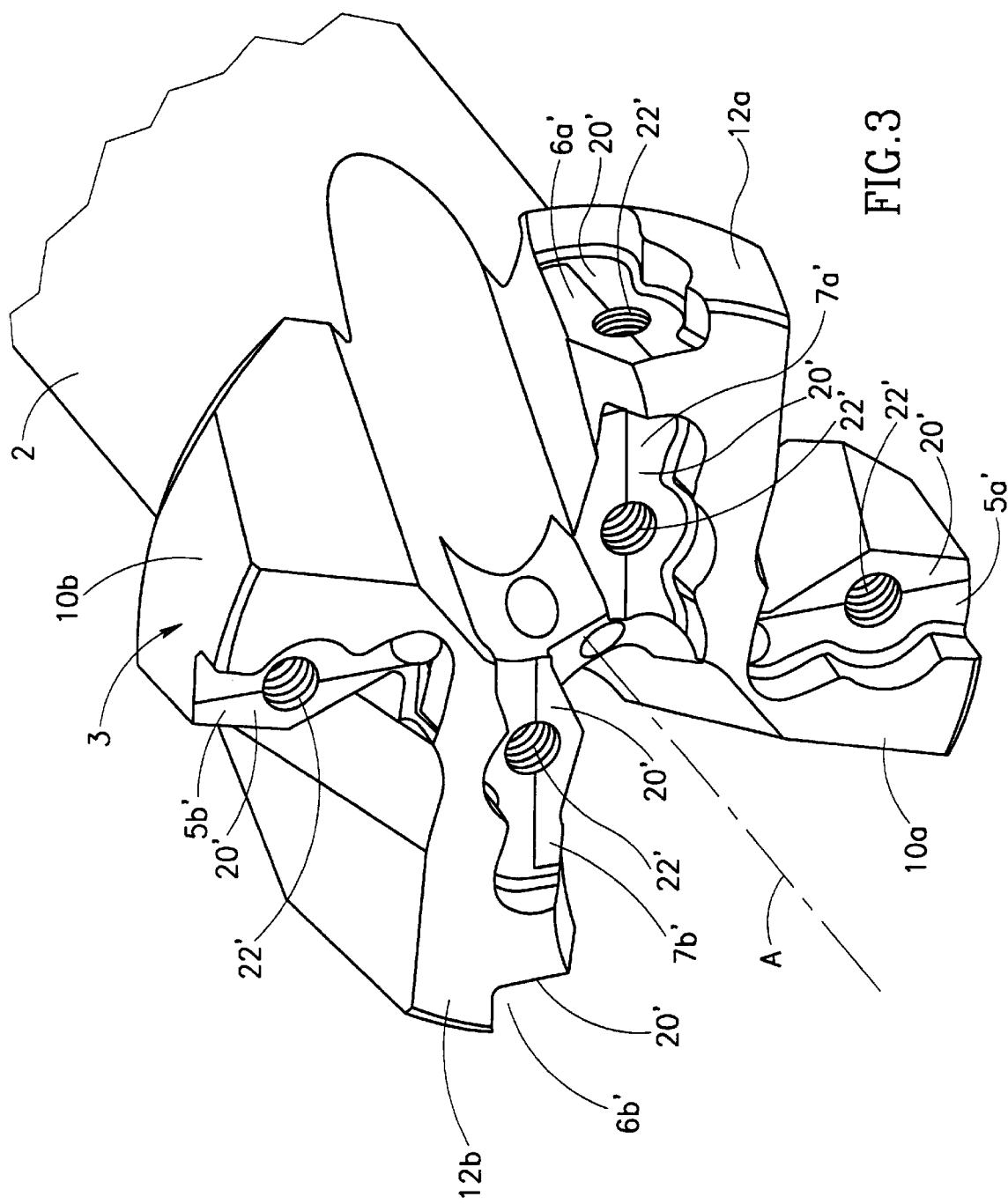
FIG. 3 is a perspective view of the cutting tool shown in FIG. 2 without the cutting inserts mounted therein.

The insert receiving pockets 5a', 5b', 6a', 6b' and 7a', 7b' in which the respective cutting inserts 5a, 5b, 6a, 6b and 7a, 7b are mounted, are specifically shown in FIG. 3. As seen, each of the insert receiving pockets has a base wall 20' formed with a clamping screw threaded bore 22' which is to be aligned with the clamping screw through bore 22 of the corresponding cutting insert for receiving therein the clamping screw 13.

As seen in FIG. 3, the insert receiving pockets 5a', 5b', 6a', 6b' and 7a', 7b' are formed on different body portions 10a, 10b, 12a and 12b of the cutting head 3 and are oriented in different manners. In particular, the insert receiving pockets 5a', 5b' are formed on the respective body portions 10a, 10b and the insert receiving pockets 7a', 7b' are formed on the respective body portions 12a, 12b, all these pockets being oriented in such a manner that their respective base walls 20' are substantially perpendicular to the axis of rotation A and their clamping screw threaded bores 22' are directed substantially parallel to this axis A. The insert receiving pockets 6a', 6b' are formed on the same body portions 12a, 12b as the insert receiving pockets 7a', 7b', however, their base walls 20' are oriented substantially parallel to the axis of rotation so that their clamping screw threaded bores 22' are directed substantially in a radial direction.

With the arrangement as described above, the cutting inserts 5a, 5b and 7a, 7b are mounted in the respective insert receiving pockets 5a', 5b' and 7a', 7b' so as to present their major cutting edges 18 in an operative position, whilst the cutting inserts 6a, 6b are mounted in the insert receiving pockets 6a', 6b' so that their minor cutting edges 19 are operative. The operative cutting edges 18 of the cutting inserts 5a, 5b and 7a, 7b and the operative cutting edges 19 of the cutting inserts 6a, 6b lie in a plane perpendicular to the axis of rotation A of the cutting tool 1 and are directed substantially in the radial direction relative to this axis A.

As seen in FIG. 3, the insert receiving pockets 5a', 5b' and 6a', 6b' are formed at the periphery of their respective body portions 10a, 10b and 12a, 12b and the insert receiving pockets 7a', 7b' are formed at the body portions 12a, 12b close to the axis of rotation A. For this reason, the cutting inserts 5a, 5b and 6a, 6b mounted in the respective insert receiving pockets 5a', 5b' and 6a' 6b' will be further referred to as first outer cutting inserts 5a, 5b and second outer cutting inserts 6a, 6b, and the cutting inserts 7a, 7b mounted in the insert receiving pockets 7a', 7b' will be further referred to as inner cutting inserts 7a, 7b.

Figure 4:
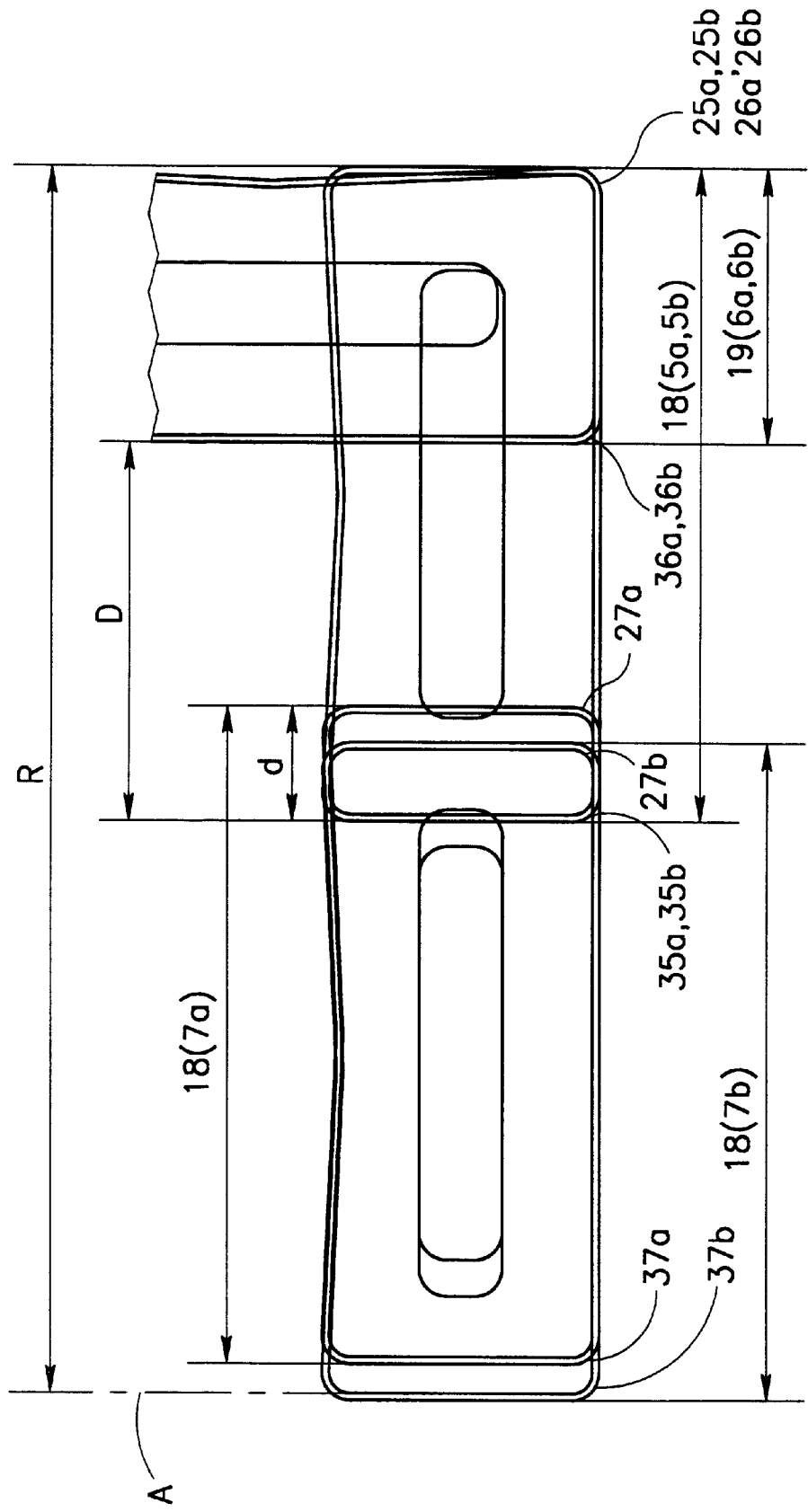
FIG. 4 is a schematic illustration of the mutual arrangement of operative cutting edges of cutting inserts mounted on the cutting tool shown in FIG. 1, when superimposed on a plane containing the axis of rotation A of the cutting tool shown in FIG. 1.

FIG. 4 is a schematic illustration of the mutual disposition of the operative cutting edges 18 of the cutting inserts 5a, 5b, 7a, 7b and the operative cutting edges 19 of the cutting inserts 6a, 6b, when superimposed on a plane containing the axis of rotation A of the cutting tool 1.

As seen in FIG. 4, the operative cutting edges 18 of the first outer cutting inserts 5a and 5b coincide so that their respective outermost ends 25a and 25b are equidistant from the axis of rotation A and are spaced therefrom at a distance R which defines a cutting radius of the cutting tool 1.

The operative cutting edges 18 of the inner cutting inserts 7a and 7b are disposed so that the innermost end 37b of the cutting edge 18 of the cutting insert 7b reaches the axis A whilst the innermost end 37a of the cutting edge 18 of the cutting insert 7a is slightly aside therefrom. Consequently, the outermost end 27a of the cutting edge 18 of the cutting insert 7a is more remote from the axis A than the outermost end 27b of the cutting edge 18 of the cutting insert 7b.

Furthermore, the inner cutting inserts 7a, 7b and the first outer cutting inserts 5a, 5b are disposed in such mutual relationship that their cutting edges partially overlap, since, as seen in FIG. 4, the outermost ends 27a, 27b of the respective inner cutting inserts 7a, 7b are located further from the axis A than the innermost ends 35a, 35b of the first outer cutting inserts 5a, 5b.

As regards the second outer cutting inserts 6a, 6b, they are disposed in such a manner that the outermost ends 26a and 26b of their operative cutting edges 19 are equidistant from the axis A and coincide with the outermost ends 25a, 25b of the cutting edges 18 of the first outer cutting inserts 5a, 5b. Since the cutting edges 19 are shorter than the cutting edges 18, the innermost ends 36a, 36b of the cutting edges 19 of the cutting inserts 6a, 6b are disposed substantially further from the axis A than the innermost ends 35a, 35b of the cutting edges 18 of the cutting inserts 5a, 5b.

Thus, by virtue of the difference in the lengths of the cutting edges 18 and 19 of the respective first and second outer cutting inserts 5a, 5b and 6a, 6b, which difference is designated as D in FIG. 4, the overlap d between the cutting edges 18 of the first outer cutting inserts 5a, 5b and the inner cutting inserts 7a, 7b may vary, whereby cutting tools of different cutting radii may be provided.

With the arrangement of the cutting inserts according to the present invention and, in particular, with the provision of the additional, second outer cutting inserts 6a, 6b, the total number of the outer cutting inserts 5a, 5b, 6a, 6b working at a periphery of the cutting tool is twice the number of the inner cutting inserts 7a, 7b disposed closer to the axis of rotation A. The increased number of effective outer cutting edges enables the cutting tool 1 to cut with an increased efficiency at its peripheral region.

Figure 5:
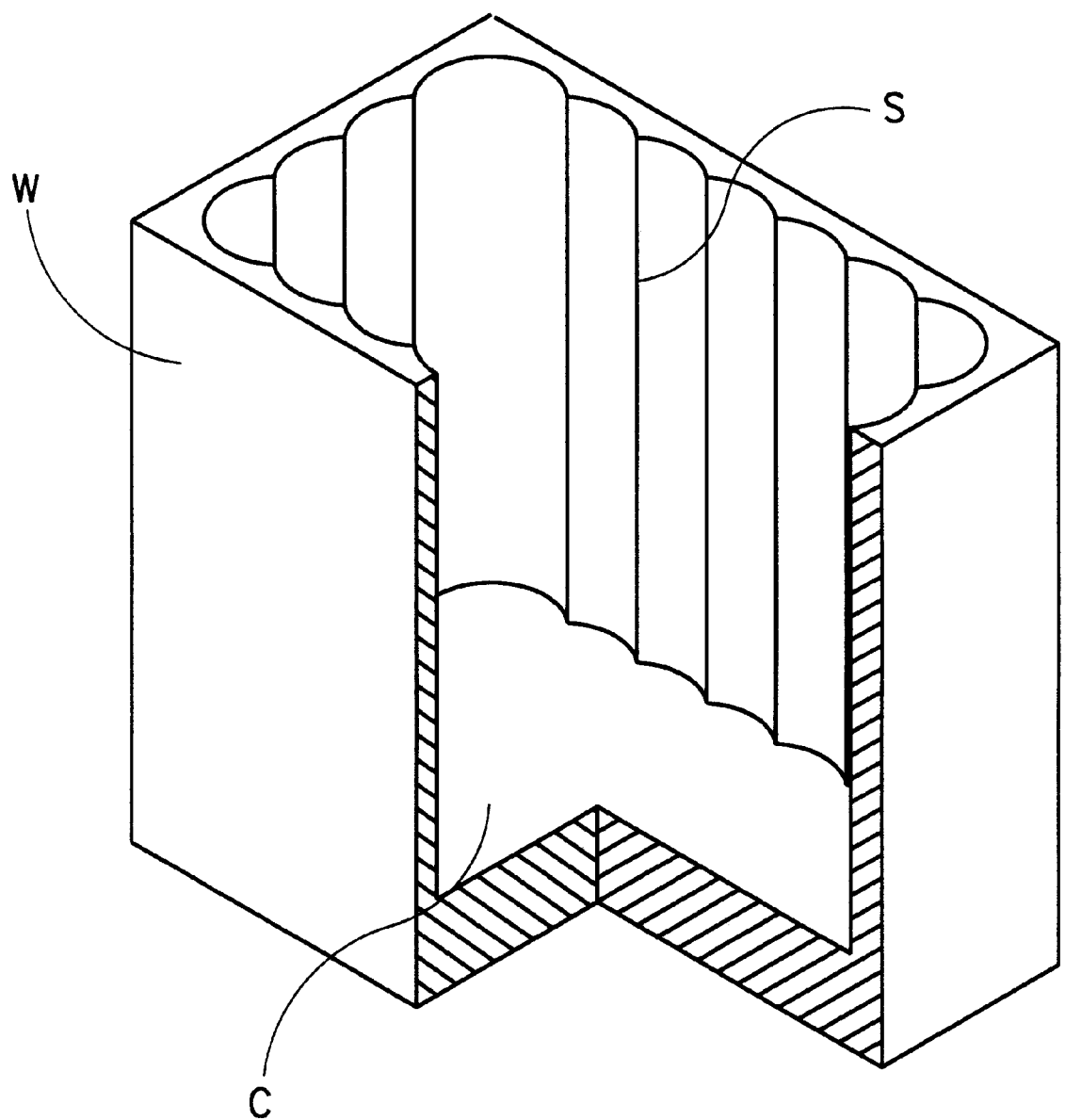
FIG. 5 is an illustration of a workpiece machined by a cutting tool of the present invention.

FIG. 5 illustrates one possible application of the cutting tool according to the present invention. FIG. 5 shows a workpiece W which has undergone a series of overlapping plunging operations by the cutting tool described above in which all the cutting inserts were operative and during which the interior volume of the workpiece has been removed leaving wavy side walls S. The waviness of the side walls can now be significantly reduced by another series of plunging operations therealong where only peripheral cutting inserts of the cutting tool will be operative.

The cutting tool of the present invention may have alternative designs not described above and not shown in the drawings. Thus, for example, the cutting tool may have a different number of chip evacuation flutes and a different number of cutting inserts mounted therein. The cutting inserts used in the cutting tool do not necessarily need to be identical and they may have different sizes and different lengths of their operative cutting edges. The cutting inserts may have any appropriate shapes, including any appropriate design of their front and trailing portions.

| THE LIST OF REFERENCE NUMERALS | |
|---|---|
| 1 | cutting tool |
| 2 | tool shank |
| 3 | cutting head |
| 5a, 5b | first outer cutting inserts |
| 5a', 5b' | insert receiving pockets for first outer cutting inserts |
| 6a, 6b | second outer cutting inserts |
| 6a', 6b' | insert receiving pockets for second outer cutting inserts |
| 7a, 7b | inner cutting inserts |
| 7a', 7b' | insert receiving pockets for inner cutting inserts |
| 8 | front face |
| 10a, 10b, 12a, 12b | body portions |
| 13 | clamping screw |
| 14 | chip evacuation flutes |
| 15 | front cutting portion of each cutting insert |
| 16 | operative front surface of the front cutting portion 15 |
| 18 | major cutting edges of each cutting insert |
| 19 | minor cutting edges of each cutting insert |
| 20 | trailing mounting portion of each cutting insert |
| 20' | base wall of each insert receiving pocket |
| 22 | clamping screw through bore of each cutting insert |
| 22' | clamping screw threaded bore of each insert receiving pocket |
| 25a, 25b | outermost ends of the operative cutting edges 18 of the first outer cutting inserts 5a, 5b |
| 26a, 26b | outermost ends of the operative cutting edges 19 of the second outer cutting inserts 6a, 6b |
| 27a, 27b | outermost ends of the operative cutting edges 18 of the inner cutting inserts 7a, 7b |
| 35a, 35b | innermost ends of the operative cutting edges 18 of the first outer cutting inserts 5a, 5b |
| 36a, 36b | innermost ends of the operative cutting edges 19 of the second outer cutting inserts 6a, 6b |
| 37a, 37b | innermost ends of the operative cutting edges 18 of the inner cutting inserts 7a, 7b |
| A | longitudinal axis of rotation of the cutting tool |
| C | cavity in a workpiece W |
| D | difference in the lengths of the major and minor cutting edges 18 and 19 |
| R | cutting radius of the cutting tool |
| S | side wall of the cavity C |
| W | Workpiece |
| d | overlap between the cutting edges 18 of the first outer cutting inserts 5a, 5b and the inner cutting inserts 7a, 7b |

What is claimed is:

1. A rotary cutting tool with a longitudinal axis of rotation, having a cutting head formed with at least two chip evacuation flutes and at least two body portions, each body portion being formed between two adjacent chip evacuation flutes, said body portions carrying, at a front face of the cutting head, a plurality of cutting inserts, each cutting insert having an operative cutting edge and being mounted so that its operative cutting edge lies substantially in a plane perpendicular to said axis of rotation;

a first body portion of said two body portions carrying a first outer cutting insert and a second body portion of said two body portions carrying a second outer cutting insert, the operative cutting edge of the second outer cutting insert being substantially shorter than the operative cutting edge of the first outer cutting insert, outermost ends of the operative cutting edges of the first and second outer cutting inserts being substantially equidistant from said axis of rotation and being spaced therefrom at a distance defining a cutting radius of the cutting tool, wherein the first and second outer cutting inserts are identical and have major and minor cutting edges, the first outer cutting insert being mounted so as to present its major cutting edge in an operative position and the second outer cutting insert being mounted so as to present its minor cutting edge in an operative position.

2. A rotary cutting tool with a longitudinal axis of rotation, having a cutting head formed with at least two chip evacuation flutes and at least two body portions, each body portion being formed between two adjacent chip evacuation flutes, said body portions carrying, at a front face of the cutting head, a plurality of cutting inserts, each cutting insert having an operative cutting edge and being mounted so that its operative cutting edge lies substantially in a plane perpendicular to said axis of rotation;

a first body portion of said two body portions carrying a first outer cutting insert and a second body portion of said two body portions carrying a second outer cutting insert, the operative cutting edge of the second outer cutting insert being substantially shorter than the operative cutting edge of the first outer cutting insert, outermost ends of the operative cutting edges of the first and second outer cutting inserts being substantially equidistant from said axis of rotation and being spaced therefrom at a distance defining a cutting radius of the cutting tool; wherein the second body portion also carries an inner cutting insert disposed closer to said axis of rotation than said second outer cutting insert and spaced radially therefrom.

3. A rotary cutting tool according to claim 2, wherein each of the cutting inserts has an insert clamping screw through bore and is mounted in a corresponding insert receiving pocket formed on the cutting head, the insert receiving pocket having a base surface formed with a pocket clamping screw threaded bore to be aligned with the insert clamping through bore.

4. A rotary cutting tool according to claim 3, wherein the base surfaces of the insert receiving pockets of the inner and the first outer cutting inserts are substantially parallel to the plane in which the operative cutting edges of the cutting inserts lie and the clamping screw through bores of the inner and the first outer cutting inserts and the clamping screw threaded bores of their corresponding pockets are directed substantially co-directionally with the axis of rotation of the cutting tool.

5. A rotary cutting tool according to claim 3, wherein the base surface of the insert receiving pocket of the second outer cutting insert is substantially perpendicular to the plane in which the operative cutting edges lie and substantially perpendicular to the operative cutting edge of the second outer cutting insert, and the clamping screw through bore of the second outer cutting insert and the clamping screw threaded bore of its corresponding insert receiving pocket are directed substantially radially with respect to the axis of rotation of the cutting tool.

6. A rotary cutting tool according to claim 2, wherein the inner and the first and second outer cutting inserts are all identical and are of a kind having substantially mutually perpendicular major and minor cutting edges, the inner and the first outer cutting inserts being mounted so as to present their major cutting edges in an operative position, whilst the second outer cutting insert is mounted so as to present its minor cutting edge in an operative position.

7. A rotary cutting tool according to claim 6, wherein the inner and the first and second outer cutting inserts are of a kind having a front cutting portion and a trailing mounting portion, the front cutting portion being formed with an operative front surface associated with substantially mutually perpendicular major and minor cutting edges, and the trailing mounting portion having a clamping screw bore substantially perpendicular to said major cutting edge and substantially co-directional with said minor cutting edge.

8. The rotary cutting tool of claim 1, wherein a total of four chip evacuation flutes and four body portions are provided, a first pair of body portions carrying said first and second outer cutting inserts, and a second pair of body portions carrying third and fourth outer cutting inserts, each of said third and fourth outer cutting inserts having an operative cutting edge lying substantially in a plane perpendicular to said axis of rotation, the operative cutting edge of the fourth outer cutting insert being substantially shorter than the operative cutting edge of the third outer cutting insert, outermost ends of the operative cutting edges of the first, second, third and fourth outer cutting inserts being substantially equidistant from said axis of rotation and also being spaced therefrom at said distance defining a cutting radius of the cutting tool.

* * * * *